United States Patent
Lee (10) Patent No.: US 11,385,345 B2
(45) Date of Patent: *Jul. 12, 2022

(54) LINEAR VIRTUAL FENCE SYSTEM USING RADAR AND REFLECTOR

(71) Applicant: BITSENSING INC., Seoul (KR)

(72) Inventor: Sung Jin Lee, Seongnam-si (KR)

(73) Assignee: Bitsensing Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,918

(22) Filed: May 15, 2020

(65) Prior Publication Data

US 2020/0278443 A1    Sep. 3, 2020

Related U.S. Application Data

(63) Continuation of application No. 15/833,904, filed on Dec. 6, 2017, now Pat. No. 10,656,264.

(Continued)

(51) Int. Cl.
*G01S 13/88* (2006.01)
*G08B 13/24* (2006.01)
(Continued)

(52) U.S. Cl.
CPC ............ *G01S 13/886* (2013.01); *G01S 13/56* (2013.01); *G01S 13/87* (2013.01);
(Continued)

(58) Field of Classification Search
CPC .... G01S 13/886; G01S 13/56; G01S 13/1387; G08B 13/2491; G08B 13/2494; G08B 13/184; H01Q 1/02
See application file for complete search history.

(56) References Cited

U.S. PATENT DOCUMENTS 3,725,888 A * 4/1973 Solomon ................. G01S 13/56
340/522
3,761,909 A * 9/1973 Schweitzer ........ G08B 13/1627
367/94

(Continued)

FOREIGN PATENT DOCUMENTS

DE 0023625 A2 * 2/1981 ............. G08B 13/24
EP 2998761 A1 * 3/2016 ............. G01S 13/02
JP H065276 B2 * 1/1994

*Primary Examiner* — Chico A Foxx
(74) *Attorney, Agent, or Firm* — Procopio, Cory, Hargreaves & Savitch LLP (57) ABSTRACT

A system, including: a radar including a transmitter and a receiver, the transmitter configured to transmit an electromagnetic wave; a reflector placed a predetermined distance away from the radar, the reflector configured to reflect the transmitted electromagnetic wave back to the receiver; and a control unit coupled to the radar and configured to measure a magnitude of the reflected electromagnetic wave received at the receiver from the reflector by measuring Doppler signal corresponding to the predetermined distance, wherein the control unit is configured to measure a reference value of the magnitude of the reflected electromagnetic wave when no intrusions are occurring, and wherein the control unit is configured to trigger an alarm when the magnitude of the reflected electromagnetic wave changes from the reference value.

9 Claims, 9 Drawing Sheets

Related U.S. Application Data (60) Provisional application No. 62/430,759, filed on Dec. 6, 2016.

(51) Int. Cl.
*H01Q 1/02* (2006.01)
*G01S 13/56* (2006.01)
*G01S 13/87* (2006.01)
*G08B 13/184* (2006.01)

(52) U.S. Cl.
CPC ..... *G08B 13/2491* (2013.01); *G08B 13/2494* (2013.01); *H01Q 1/02* (2013.01); *G08B 13/184* (2013.01)

(56) References Cited

U.S. PATENT DOCUMENTS

| | | | | |
|---|---|---|---|---|
| 3,866,198 A * | 2/1975 | Cohen | ............... | G08B 13/1618 340/522 |
| 4,275,390 A * | 6/1981 | Heywang | ........... | G08B 13/2494 342/28 |
| 4,339,660 A * | 7/1982 | Buchholz | ............... | G01S 7/499 250/221 |
| 4,903,009 A * | 2/1990 | D'Ambrosia | ........... | G01S 17/48 340/556 |
| 4,952,911 A * | 8/1990 | D'Ambrosia | ........ | G08B 13/187 340/557 |
| 4,972,192 A * | 11/1990 | Bruder | ................... | G01S 13/50 342/6 |
| 5,280,622 A * | 1/1994 | Tino | ........................ | B25J 19/06 700/255 |
| 6,466,157 B1 * | 10/2002 | Bjornholt | ................ | G01S 7/032 340/545.3 |
| 6,812,450 B2 * | 11/2004 | Hipp | ...................... | G01S 17/87 250/221 |
| 6,946,643 B1 * | 9/2005 | Fayfield | .................... | G01V 8/14 250/221 |
| 6,950,021 B2 * | 9/2005 | Butler | ..................... | G01S 13/04 340/446 |
| 7,126,477 B2 * | 10/2006 | Gallivan | ............. | F41H 13/0068 340/567 |
| 7,902,979 B2 * | 3/2011 | Brown | .................. | G02B 17/00 340/552 |
| 8,179,149 B1 * | 5/2012 | Holly | ................ | G08B 13/2497 324/629 |
| 9,247,215 B1 * | 1/2016 | Athan | ................ | G08B 13/1966 |
| 9,761,113 B1 * | 9/2017 | Gelineau | ................. | F16P 3/144 |
| 2003/0011471 A1 * | 1/2003 | Goings | ............... | B60R 25/1009 340/426.1 |
| 2005/0156743 A1 * | 7/2005 | Gallivan | ................ | G08B 15/00 340/573.4 |
| 2009/0201152 A1 * | 8/2009 | Karr | ......................... | G01S 5/14 340/545.6 |
| 2010/0302090 A1 * | 12/2010 | Wu | .................... | G08B 13/2494 342/160 |
| 2011/0049235 A1 * | 3/2011 | Gerigk | ................. | G07D 7/2033 235/380 |
| 2014/0293747 A1 * | 10/2014 | Calvarese | ............... | G01S 7/524 367/95 |
| 2015/0338505 A1 * | 11/2015 | Oshima | .................. | G01S 13/58 342/107 |

\* cited by examiner

LINEAR VIRTUAL FENCE SYSTEM USING RADAR AND REFLECTOR

CROSS-REFERENCE TO RELATED APPLICATIONS

The present application is a continuation application of U.S. patent application Ser. No. 15/833,904 (filed Dec. 6, 2017), which claimed the benefit of priority of U.S. Provisional Patent Application No. 62/430,759, filed Dec. 6, 2016. The disclosures of the above-referenced applications are incorporated herein by reference.

BACKGROUND

Field of the Invention

The present disclosure relates to electronic boundary systems, and more specifically, to a linear virtual boundary system that radiates electromagnetic waves towards a certain area that needs to be bounded and detects intrusions using a reflector.

Background

Bounded areas that restrict the entry of people generally have a physical fence or surveillance device, such as a surveillance camera, installed at or around the bounded area. For example, in the case of a wall or fence installed in a secured area, people can freely move around within the inner part of the fence, while the people outside the fence also can freely move around the outer part. Normal entries and exits between the inner part and the outer part occur at the entry/exit points. Entries or exits carried out at points other than the entry/exit points (e.g., by jumping over the wall or fence) can be considered unlawful entries. An entry point is generally shorter in length when compared to the fence, so a surveillance camera may be enough to monitor this area. In contrast, national borders or airfields, which may have very long fences, it may be very difficult to monitor the whole length of the border with surveillance cameras. Therefore, it is necessary to create an electronic boundary system that can detect unlawful intrusions.

Figure 1A:
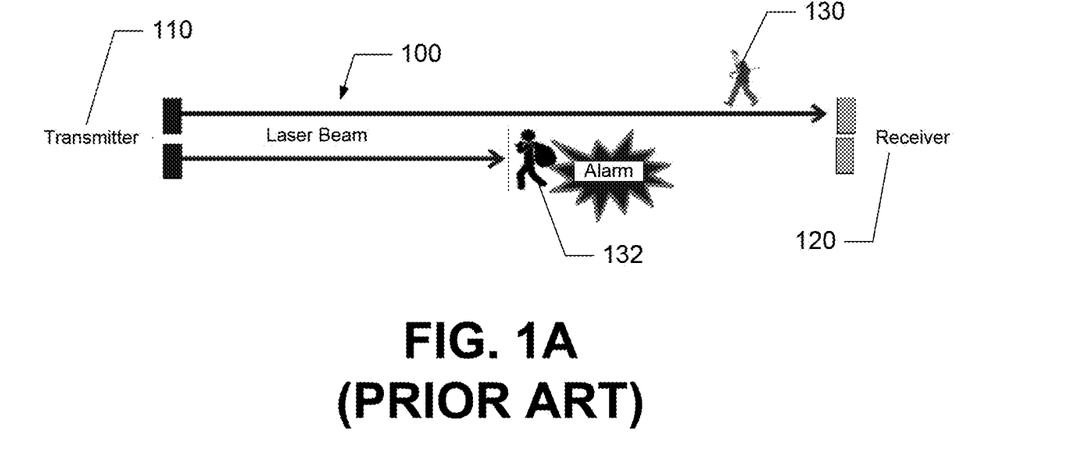
FIG. 1A shows a situation in which a laser beam is used to make an immediate judgement about an intrusion.

FIG. 1A shows a situation in which a laser beam 100 is used to make an immediate judgement about an intrusion. The laser technology enables the beam width to be narrowed to a sharp, arrowhead-like form. Therefore, in straight-line sections, it is possible to create a secured and bounded area at a very precise level if the transmitter 110 and the receiver 120 are placed at a 1:1 ratio. In FIG. 1A, person 130 is outside of the bounded area formed by the transmitter 110 and the receiver 120, while person 132 is within the bounded area and so triggers an alarm. However, the lasers are generally used indoors rather than outdoors because the light from the laser can become scattered, reflected, and absorbed by environmental factors (e.g., dust, bugs, mist, and rain) when used outdoors. This may lead to higher misdetection rates.

Figure 1B:
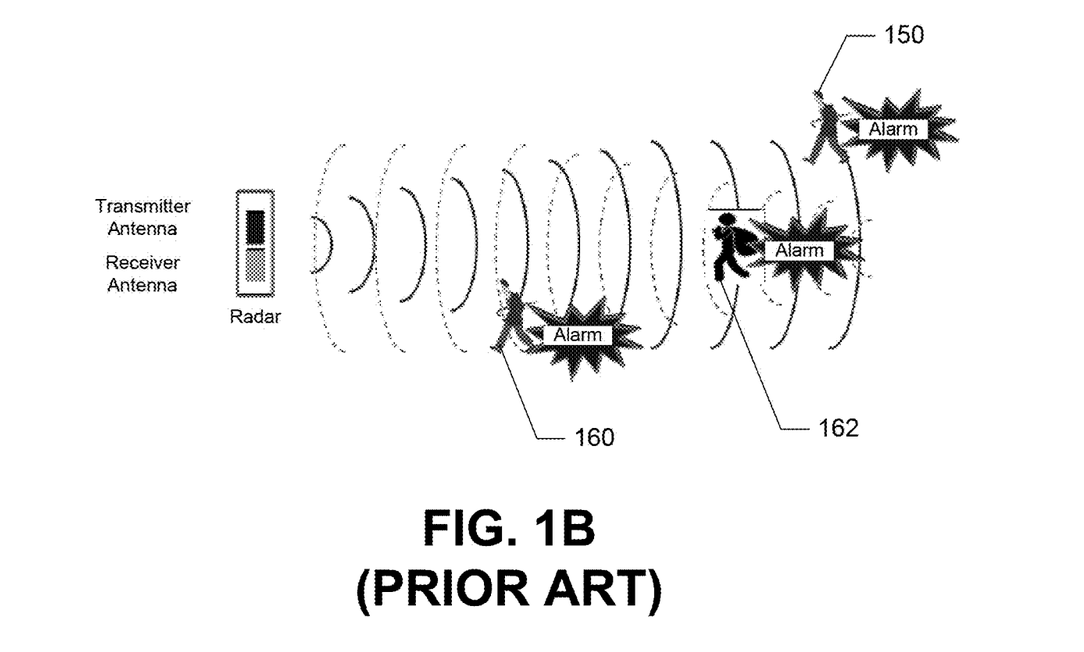
FIG. 1B shows one example of setting boundaries using electromagnetic waves.

FIG. 1B shows one example (and drawbacks) of setting boundaries using electromagnetic waves. The electromagnetic waves transmitted from a radar, for example, are more suited for outdoor boundary systems than a laser system because misdetection problems caused by the environment (e.g., mist, rain, dust, etc.) seldom occur. However, although the electromagnetic waves have linear properties, the waves spread radially as the travel distance increases. This may cause unwanted detections of intrusions outside of the original bounded area. That is, if the original bounded area is a linear fence, detections in areas outside of the linear fence are unwanted detections. The spreading properties of the electromagnetic waves may cause this type of unwanted detections because the bounded area of the radar becomes wider at distances that are farther away from the radar. Therefore, unlike lasers, radar sensors are not well-suited for precise detections within linear bounded areas. In FIG. 1B, although all three people 150, 160, 162 are detected by the radar and trigger alarms, the detections of persons 150 and 160 are unwanted detections caused by the spreading properties of the electromagnetic waves since persons 150 and 160 are outside of the bounded area.

Other conventional systems have tried to address the shortcomings of the spreading properties of the electromagnetic waves by placing multiple radars at certain intervals to form a virtual fence. However, even with the high cost of having multiple expensive radars, these conventional systems are not able to fully address the unwanted detections due to the spreading properties of the electromagnetic waves.

SUMMARY

The present disclosure describes an electronic boundary system which addresses the shortcomings of the lasers and the radar-only systems.

In one embodiment, a system is disclosed. The system includes: a radar including a transmitter and a receiver, the transmitter configured to transmit an electromagnetic wave; a reflector placed a predetermined distance away from the radar, the reflector configured to reflect the transmitted electromagnetic wave back to the receiver; and a control unit coupled to the radar and configured to measure a magnitude of the reflected electromagnetic wave received at the receiver from the reflector by measuring Doppler signal corresponding to the predetermined distance, wherein the control unit is configured to measure a reference value of the magnitude of the reflected electromagnetic wave when no intrusions are occurring, and wherein the control unit is configured to trigger an alarm when the magnitude of the reflected electromagnetic wave changes from the reference value.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As stated above, although the beam width of the laser beam can be adjusted to form an electronic boundary around a bounded area, the lasers are generally used indoors rather than outdoors because the light from the laser can become scattered, reflected, and absorbed by environmental factors when used outdoors. Further, although the electromagnetic waves transmitted from radar, for example, are more suited for outdoor boundary systems, the electromagnetic waves spread radially as the travel distance increases, which may cause unwanted detections of the intrusions outside of the original bounded area.

Certain implementations of the present disclosure provide an electronic boundary system which addresses the shortcomings of the lasers and the radar-only systems. After reading these descriptions, it will become apparent how to implement the disclosure in various implementations and applications. However, although various implementations of the present disclosure will be described herein, it is to be understood that these implementations are presented by way of example only, and not limitation. As such, this detailed description of various implementations should not be construed to limit the scope or breadth of the present disclosure.

In one implementation of the electronic boundary system, a reflector is placed a predetermined distance away from the radar to reflect the electromagnetic wave transmitted from the radar. The predetermined distance is generally configured to be the distance suitable to build an electrical fence. In one implementation, the predetermined distance is between 5 and 200 meters.

Initially, when the reflected wave is received at the radar, the reception level of the reflected wave is measured and recorded as a reference value. When a change is detected in the reference value, the detection is then considered an intrusion and the electronic boundary system takes measures (e.g., alarms, etc.) to alert the user of the intrusion. Generally, when there is no obstruction, the reception level of the reflected wave stays at the reference value, but when there is a complete obstruction, the reception level falls below the reference value to near zero. Any other level of obstructions of the reflected wave will result in the reception level between the reference value and zero. In some instances, the reception level may go up above the reference value when an object/person approaches the path between the radar and the reflector without actually obstructing the reflected wave. Thus, the sensitivity of the electronic boundary system can be adjusted for any particular use.

In another implementation of the electronic boundary system, the size of the reflector is increased corresponding to the increase in the distance between the radar and the reflector to address the decrease in the reliability of the detection. In another implementation, when the radar and the reflector are not disposed on a plane with a substantially similar height (e.g., when the area to be detected by the electronic boundary system does not have coplanar topographical features and the plane of the area is uneven), the gradient for the vertical profile of the reflector is adjusted to directly face the radar. This enables linear transmission and/or reception of the electromagnetic waves by the radar. In a further implementation, the size of the reflector can be increased when the distance between the radar and the reflector increases. This can be done to prevent the reduction in the strength of the reflected electromagnetic waves. This enables an increase in the detection distance without increasing the number of radar sensors, which results in a highly reliable electronic boundary system.

Radar operates under the concept that an object in the path of the radar reflects a limited amount of electromagnetic waves back to the radar. A radar cross-section (RCS) value is a measure of how detectable an object is with the radar. A reflector is used to measure the function of the radar. With an a priori knowledge of the frequency and the output power of the electromagnetic waves, various sizes of reflectors with different RCS values can be designed for various distances between the radar and the reflector. Thus, by using both the radar and the reflector (which reflects a fixed amount of electromagnetic waves having spreading properties back to the radar), intrusions into the bounded area between the radar and the reflector can be detected with a high reliability with the detection of a change in the RCS value. That is, the unwanted detections of the radar outside of the bounded area caused by the spreading properties of electromagnetic waves can be substantially reduced by using reflectors.

Figure 2:
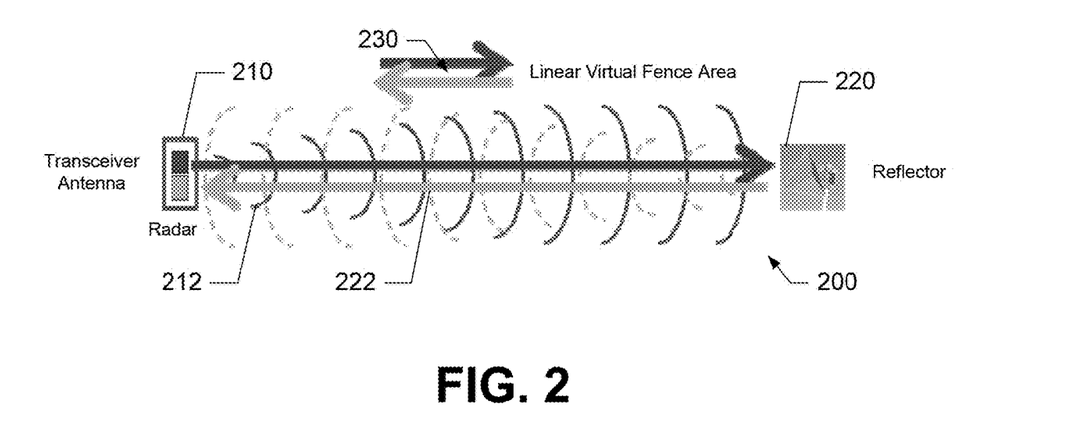
FIG. 2 is a diagram of an electronic boundary system including a radar and a reflector in accordance with one implementation of the present disclosure.

FIG. 2 is a diagram of an electronic boundary system 200 including radar 210 and reflector 220 in accordance with one implementation of the present disclosure. In the illustrated implementation of FIG. 2, the electronic boundary system 200 creates a linear virtual fence 230 using the electromagnetic waves 212 of the radar 210 and the reflector 220 placed a certain distance away from the radar 210. The electromagnetic waves 212 transmitted from the transmitting antenna travel in a linear direction while progressively spreading (marked with red curves). The electromagnetic waves 212 are incident on the reflector 220 and the incident waves 222 are reflected by the reflector 220 towards the receiving antenna of the radar 210. Accordingly, as shown in FIG. 2, using these basic functions of the radar and the reflector, a linear virtual fence is created between the radar 210 and the reflector 220 (similar to the virtual fence created using a laser beam, but without the shortcomings of the laser beam as discussed above).

Figure 3:
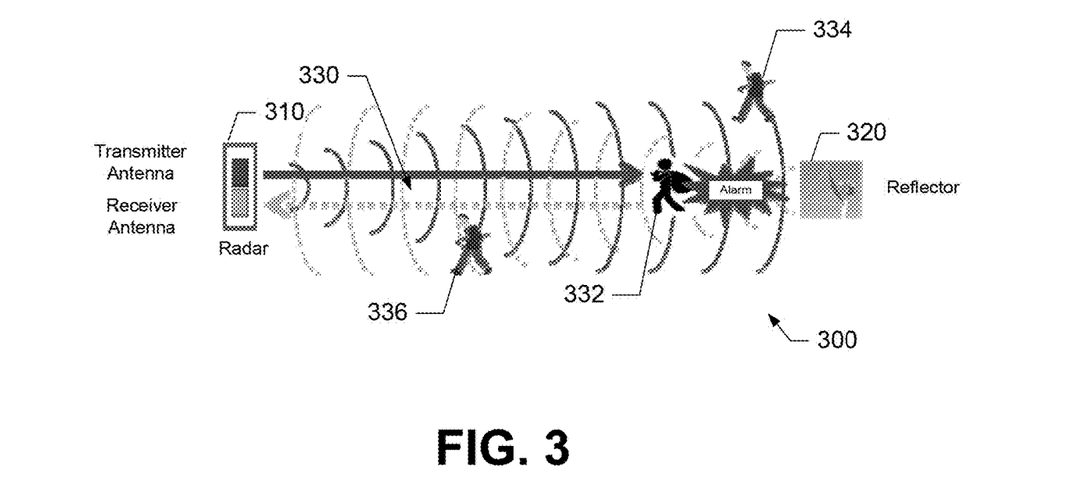
FIG. 3 is a diagram of an electronic boundary system detecting an intrusion in accordance with one implementation of the present disclosure.

FIG. 3 is a diagram of an electronic boundary system 300 detecting an intrusion in accordance with one implementation of the present disclosure. In the illustrated implementation of FIG. 3, an intrusion 332 occurs in a linear section 330 (i.e., the virtual fence) formed between the radar 310 and the reflector 320. In one implementation, the intrusion 332 causes the RCS value of the reflected wave measured at the radar 310 to rapidly decrease. Since the virtual fence created by the radar and the reflector in FIG. 3 is similar to the virtual fence created using a laser beam, the electronic boundary system 300 can be used outdoors and at long distances. Further, since persons 334 and 336 are outside of the virtual fence, they are not detected as intrusions, like persons 150 and 160.

In the illustrated implementation of FIGS. 2 and 3, the reflectors are in the shape of a triangular pyramid. In some implementations, the reflectors are configured in other shapes, including quadrangular pyramids and planes. In one implementation, a standard reflector can be used as the reflector 220, 320.

As shown below in Equation (1), formulated for a standard reflector, the RCS value (σ) increases with the area of the reflector (A). Equation (2) then shows that the larger the RCS value (which comes from the large reflector area as shown in Equation (1)), the longer the distance of the detection. Therefore, if a reflector is placed a certain distance away from the radar and there are no other objects placed between the radar and the reflector, the RCS value of the electromagnetic wave according to the size of the reflector is known beforehand.

$$\sigma \approx \frac{4\pi A^2}{\lambda^2} \quad (1)$$

$$R_{max} = \sqrt[4]{\frac{P_t G^2 \lambda^2 \sigma}{(4\pi)^3 P_{min}}} = \sqrt[4]{\frac{P_t G^2 c^2 \sigma}{f_o^2 (4\pi)^3 P_{min}}} \quad (2)$$

$R_{max}$=maximum detectable distance
$P_t$=transmit power
$P_{min}$=minimum detectable signal
$\lambda$=transmit wavelength
$\sigma$=target radar cross section (RCS) value
$f_o$=frequency
G=antenna gain
c=speed of light
A=size of the reflector Further, using the Doppler signal analysis, the radar can measure the distance of the detected object by using the time difference between the transmitted and the reflected electromagnetic waves. Thus, using the Doppler signal analysis, the radar receiver receiving the reflected electromagnetic waves can be configured to only process the reflected electromagnetic waves coming from the reflector located at a known distance away from the radar. Therefore, the radar receiver ignores all other reflected electromagnetic waves coming from distances different from the known reflector distance. That is, in one implementation, the radar measures the RCS value of the electromagnetic waves reflected from a reflector located at a particular distance and ignores all other electromagnetic waves reflected from distances other than the distance of the reflector.

Accordingly, using the above-described logic, the linear virtual fence can be created using the radar and the reflector. In one implementation, the size of the reflector is configured to be a size that has a significantly bigger RCS value when compared to the objects located near the reflector. When a new object appears near the reflector, the range of fluctuation for the RCS value of the electromagnetic waves that come from the distance of the reflector becomes wider, which can affect the reliability of the linear virtual fence. However, by using a frequency range of 24 GHz, for example, the actual size of the reflector that generates an RCS value larger than (e.g., 12 times larger) the RCS value of a person standing 100 m from the radar is 30 cm*30 cm, which is not too difficult in creating the virtual fence.

In accordance with Equations (1) and (2) (which show the relationship between the RCS value, the geometric size of the standard reflector, and the detectable distance), if the material of the reflector is metal (meaning that the reflector reflects 100% of the electromagnetic waves), the RCS value corresponds square of the reflector size and the detectable distance corresponds the fourth root of the RCS value. Therefore, even a small increase in the reflector size can significantly increase the RCS value, and in turn, the maximum detectable distance.

Figure 4:
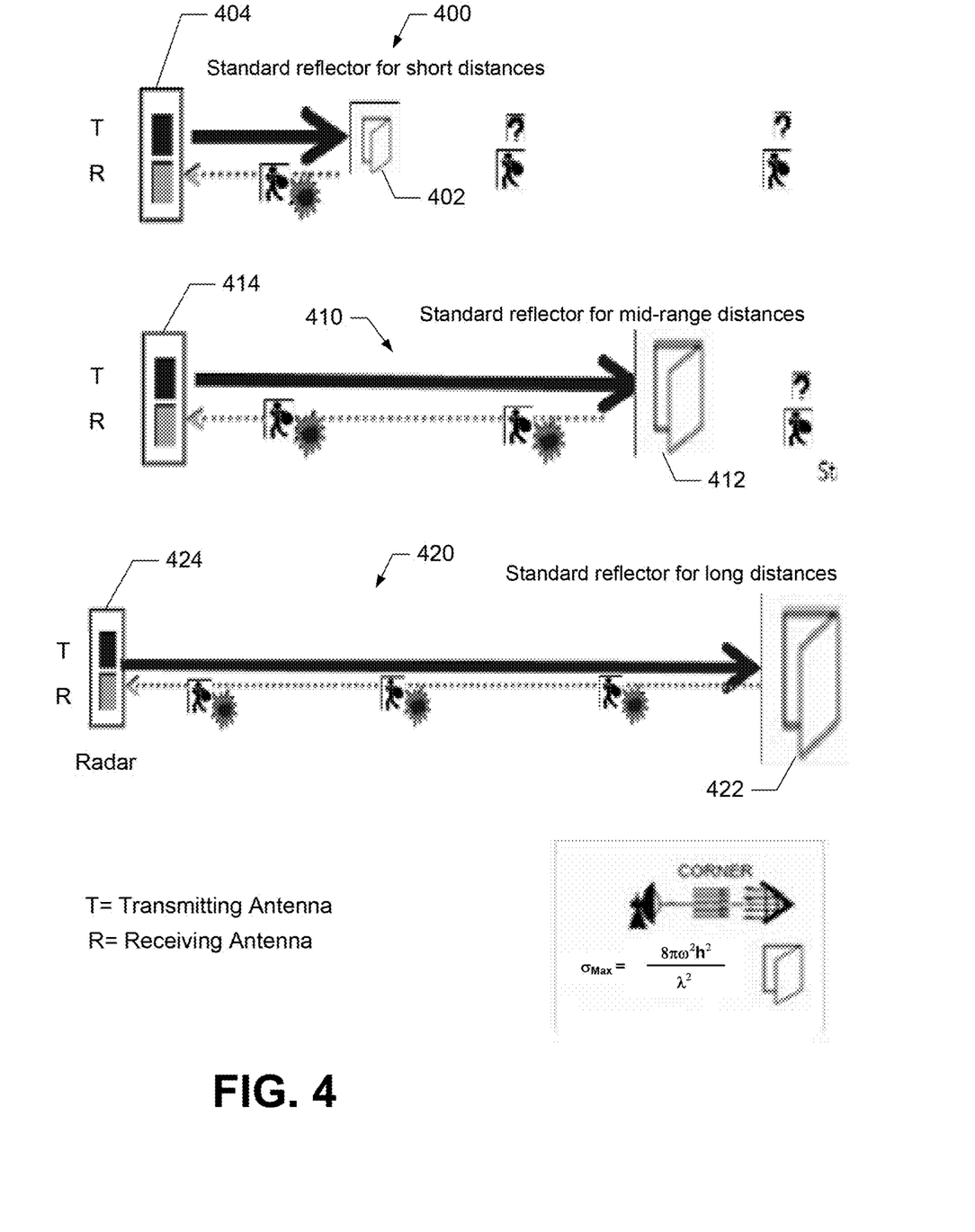
FIG. 4 is an illustration showing three electronic boundary systems, each system configured with a differently-sized reflector in accordance with one implementation of the present disclosure.

FIG. 4 is an illustration showing three electronic boundary systems 400, 410, 420, each system configured with a differently-sized reflector 402, 412, or 422 in accordance with one implementation of the present disclosure. In the illustrated implementation of FIG. 4, as the length of the virtual fence in the electronic boundary system 400, 410, or 420 becomes longer the size of the reflector 402, 412, or 422 increases accordingly. Thus, for the electronic boundary system 400 with a short virtual fence, the reflector 402 is configured to be correspondingly small. For the electronic boundary system 410 with a medium-range virtual fence, the reflector 412 is configured to be correspondingly medium sized, while for the electronic boundary system 420 with a long virtual fence, the reflector 422 is configured to be correspondingly large.

Generally, electromagnetic waves have different output limits depending on the frequency range and the waves spread with distance. Thus, the RCS value of an object decreases as the distance of the object from the radar increases. Therefore, detecting objects beyond a certain point may be very difficult. Accordingly, to address the issues related to the increase in the distance of the reflector from the radar causing reduction in the RCS value, the electronic boundary system can be configured with the correspondingly increasing size of the reflector.

That is, as the distance of the electromagnetic wave from the radar increases, the level of spreading also increases, causing a smaller RCS value for a small reflector and a lower reception during an intrusion of the virtual fence. However, if a large standard reflector is used when the reflector is relatively far from the radar, even the waves that have spread can be reflected, and thus the RCS value stays large enough to detect sudden changes in the RCS value during intrusions. If a person or an object enters into the virtual fence between the receiving antenna and the reflector, the RCS value changes rapidly (or decreases to near zero, in some implementations) and can be considered an intrusion. For example, a standard reflector with the functional value of 1 dBsm is placed 30 m away from the radar, 10 dBsm is placed at 100 m away, and 20 dBsm is placed at 200 m away.

In one implementation, if a reflector is desired to be placed farther away from the radar, a larger reflector is built, an RCS experiment is conducted on the reflector, and a virtual fence is built according to the RCS value. Similarly, if the length of a virtual fence is to be increased, then only the size of the reflector is increased. Accordingly, the distance of the virtual fence can be increased by placing the reflector farther away from the radar, without having to place multiple radars or to improve the technological function of the radars, which saves production costs and provides convenience in the installation process and maintenance.

Figure 5A:
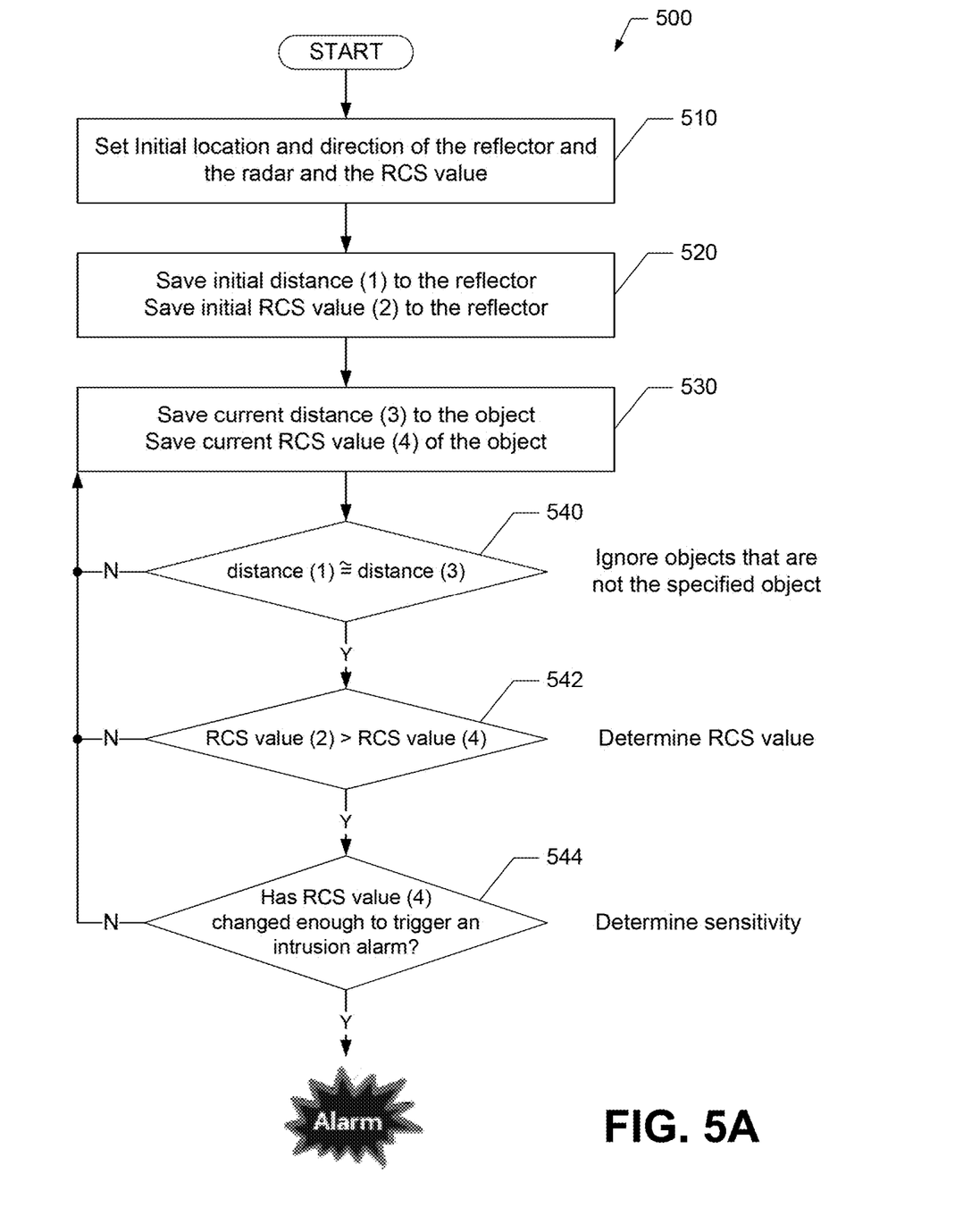
FIG. 5A is a flow diagram illustrating a technique for detecting an intrusion using an electronic boundary system in accordance with one implementation of the present disclosure.

FIG. 5A is a flow diagram 500 illustrating a technique for detecting an intrusion using an electronic boundary system in accordance with one implementation of the present disclosure. In the electronic boundary system, the electromagnetic waves radiated from the radar reach the reflector and are reflected back toward the radar. Thus, the initial location and direction of the reflector and the radar, as well as the RCS value, are set, at block 510. The distance between the radar and the reflector is then measured with the RCS value, at block 520, and both the distance and the RCS value are saved as the initial values. The RCS value is then continuously measured for comparison.

In one implementation, the current distance to the object and the current RCS value are measured, at block 530. The current distance is compared to the initial distance, at block 540. If there is a change (e.g., the current distance has change by more than a certain percentage such as 1%) in the current distance from the initial distance, it means that the reflected waves are not from the reflector and are ignored. Otherwise, if the current distance did not change (e.g., the change is within the 1% tolerance) from the initial distance (i.e., the initial distance≈the current distance, at block 540), the current RCS value is then compared to the initial value, at block 542. If the current RCS value has not decreased from the initial RCS value, it means that no objects are detected by the virtual fence set up by the radar and the reflector. Otherwise, if the drop in the current RCS value from the initial RCS value is detected, at block 542, the drop in the current RCS value is compared to a set threshold to determine whether the drop in the current RCS value warrants triggering an intrusion alarm, at block 544.

Figure 5B:
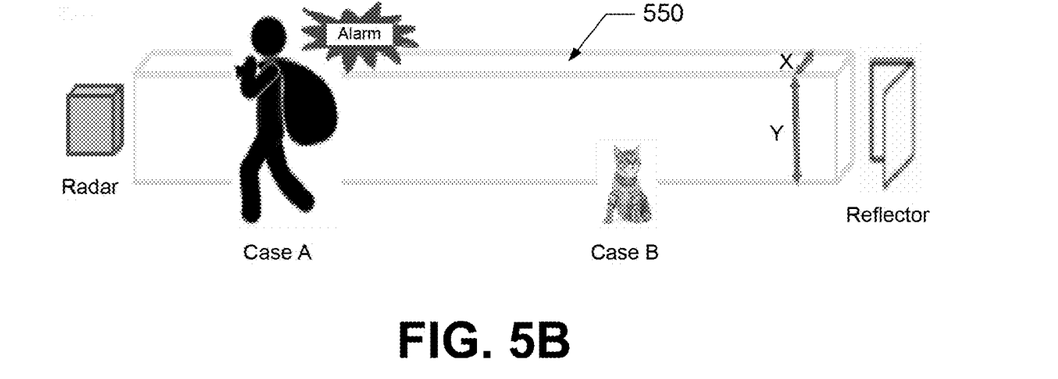
FIG. 5B shows that a virtual fence created between the radar and the reflector has a volume created by the distance from the radar to the reflector and the size of the reflector.

FIG. 5B shows that a virtual fence created between the radar and the reflector has a volume 550 created by the distance from the radar to the reflector and the size of the reflector (X*Y). Thus, the volumetric configuration of FIG. 5B is similar to a configuration of multiple laser pointers and provides the advantage of being able to adjust the sensitivity of the virtual fence. In FIG. 5B, the RCS value received at the radar is different for case A than case B. For case A, the virtual fence is completely blocked, while for case B, the virtual fence is only partially blocked. Thus, if the actual RCS value received at the radar is categorized according to the size of the object, the electronic boundary system can be adjusted to sense even the smallest objects or, conversely, only the large objects. Accordingly, by adjusting the sensitivity of the system as described above, the reliability and the adaptability of the electronic boundary system to the outside environment can be significantly increased from currently available intrusion detection systems.

Figure 6:
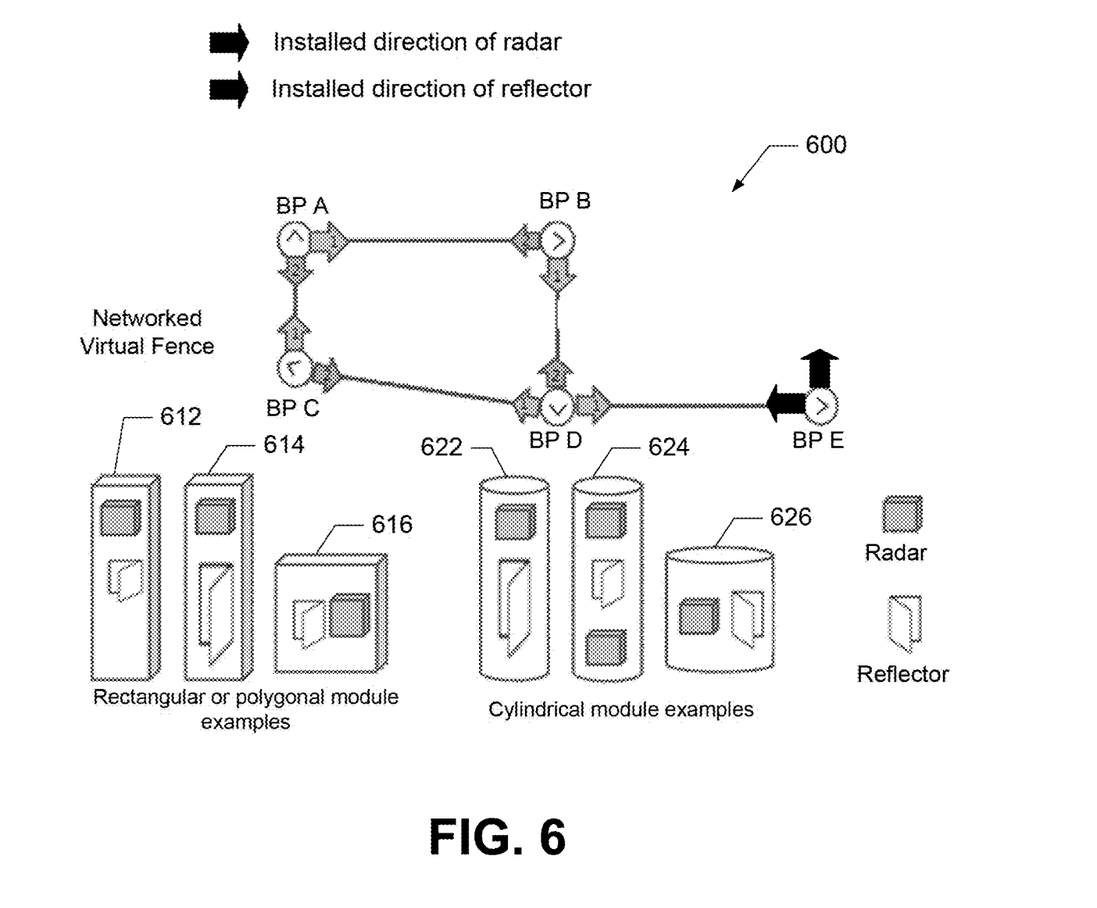
FIG. 6 is an electronic boundary system configured with a network of linear virtual fences for a certain area in accordance with one implementation of the present disclosure.

FIG. 6 is an electronic boundary system 600 configured with a network of linear virtual fences for a certain area in accordance with one implementation of the present disclosure. Although it is possible to operate the radar and the reflector separately for the linear virtual fence of an electronic boundary system, the radar and the reflector can also be assembled into one unit 612, 614, 616, 622, 624, or 626 as shown in FIG. 6. Having both the radar and the reflector included in one unit (sometimes referred to as a base point (BP) unit) provides several advantages when building networked virtual fences.

In one implementation, a unit (e.g., units 612, 614, 616, 622, 626 and BPs A, B, C, E) is manufactured with one radar and one reflector. However, in other implementations, a unit (e.g., unit 624 and BP D) can be manufactured with one or more radars and reflectors (e.g., two radars and one reflector for unit 624). Although the base point units shown in FIG. 6 include radars and reflectors in one case, the radars and/or reflectors can also be installed without enclosures. For example, depending on the environment of the surrounding area, it would be possible to install the radar on one or less enclosure and the reflector on another enclosure or no enclosure. Further, with a cylindrically-shaped unit, the direction of the reflector and the radar can be hidden, which may enable the formation of hidden detection areas. In one implementation, units 612, 614, 616 are configured as rectangular or polygonal units, while units 622, 624, 626 are configured as cylindrical units. In other implementations, different shapes of units are also possible.

Figure 7A:
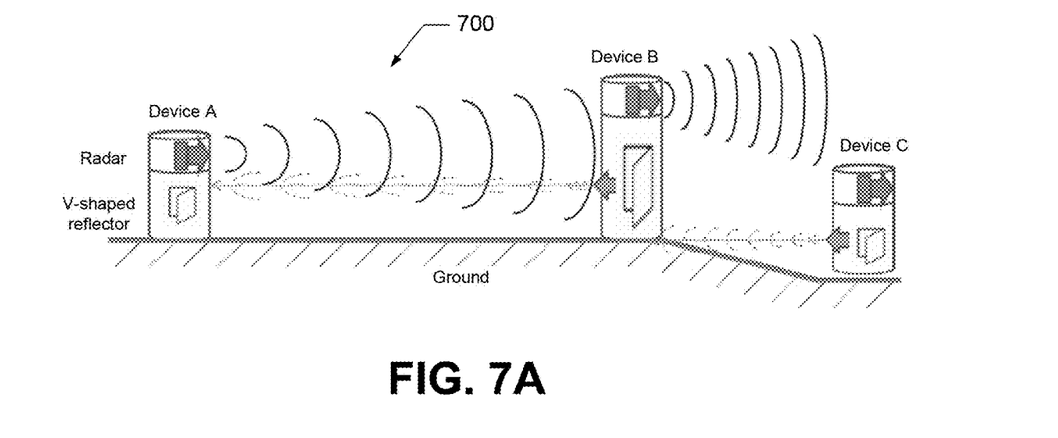
FIGS. 7A and 7B illustrate a process of configuring an electronic boundary system including a networked virtual fence with multiple shapes and sizes of reflectors and/or uneven topographical conditions in accordance with one implementation of the present disclosure.
Figure 7B:
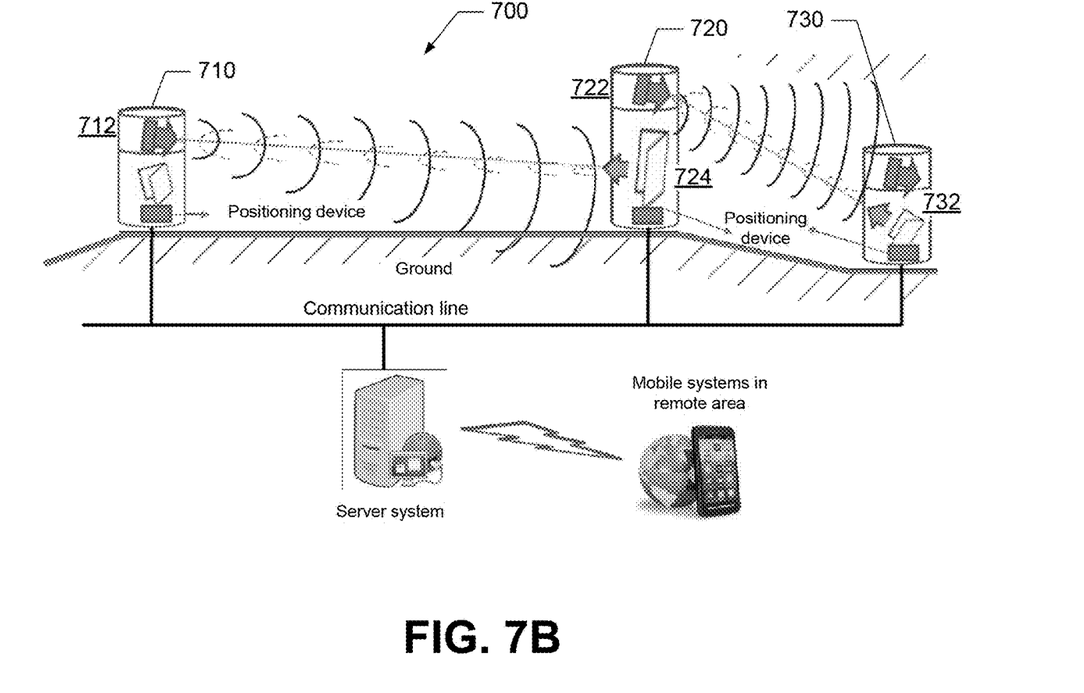

FIGS. 7A and 7B illustrate a process of configuring an electronic boundary system 700 including a networked virtual fence with multiple shapes and sizes of reflectors and/or uneven topographical conditions in accordance with one implementation of the present disclosure.

In the illustrated implementation of FIG. 7A, a radar is placed on the upper part of the base point unit and the corresponding reflector is placed on the lower part of another unit, which may cause the electromagnetic waves reflected by the reflector to not align very well with the radar that transmitted the waves. The misalignment of the radar and the reflector, as well as uneven topographical conditions, may cause the electronic boundary system 700 to malfunction. In one implementation, to address the malfunction caused by the misalignment and the uneven topographical conditions, the radar is either adjusted to be level with the corresponding reflector or the vertical angles of the reflector and/or the radar is adjusted so that the radar and the reflector face each other.

The illustrated implementation of FIG. 7B shows the adjustment made to the vertical angles and/or the positions of the reflector to configure the radar and the corresponding reflector to face each other. For example, the radar 712 of the BP unit 710 is tilted down toward the reflector 724 (which is tilted up) of the BP unit 720 so that the radar-reflector pair 710, 720 is facing each other. In another example in which uneven topographical condition is added to the misalignment condition, the radar 722 of the BP unit 720 is tilted down toward the reflector 732 (which is tilted up) of the BP unit 730 so that the radar-reflector pair 720, 730 is facing each other. An automatic positioning device can be placed at the location of a BP unit so that the radar and the reflector can be automatically aligned. The device that adjusts the angle or position can be manufactured using a support and handle or motor for the spring adjustment. Further, in FIG. 7, alarm, control server, monitor, mobile system, and other support devices can be included in the virtual fence that uses the radar and the reflector. Thus, in one implementation, when an intrusion is detected, the server can be built to set off an alarm using a voice or light, and an electronic map, such as Google Map, can be used to mark the spot of intrusion on a monitor.

Figure 8:
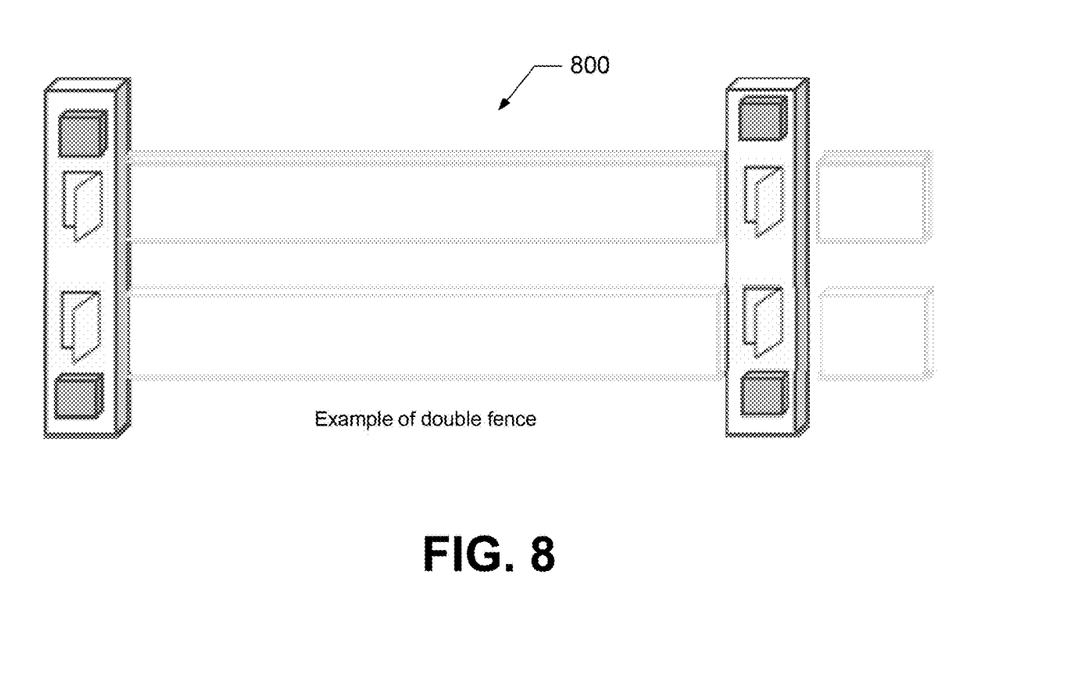
FIG. 8 shows the vertical arrangement of an electronic boundary system as an example of the transformation for the linear virtual fence in accordance with one implementation of the present disclosure.

FIG. 8 shows the vertical arrangement of an electronic boundary system 800 as an example of the transformation for the linear virtual fence in accordance with one implementation of the present disclosure. This structure is suitable for setting a boundary against large objects, and if the base point unit is built into a different form, multiple virtual fences can be created.

Figure 9:
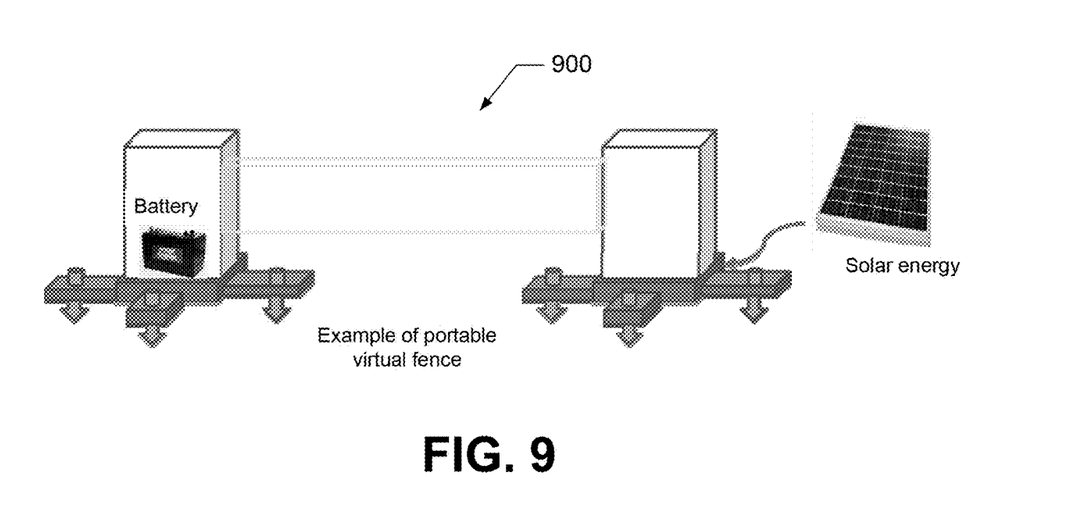
FIG. 9 shows a portable version of an electronic boundary system including the linear virtual fence in accordance with one implementation of the present disclosure.

FIG. 9 shows a portable version of an electronic boundary system 900 including the linear virtual fence in accordance with one implementation of the present disclosure. In the illustrated implementation of FIG. 9, the system 900 is made portable by installing batteries or solar energy. The advantage of this configuration is the ability to place the fence system differently depending on the region or environmental conditions. This system 900 can also be installed in areas without electrical wiring.

Figure 10:
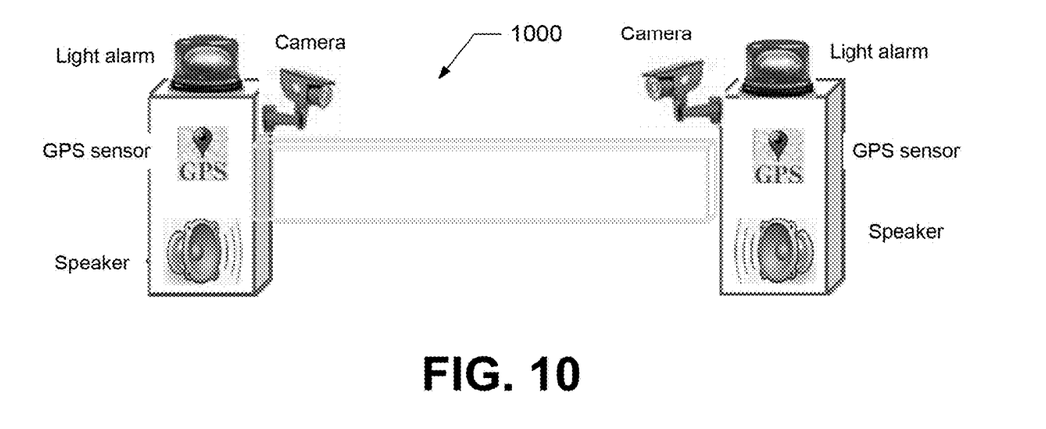
FIG. 10 shows an electronic boundary system including the linear virtual fence configured with surveillance camera, red light, lamp, speaker, GPS sensor, and other support devices in accordance with another implementation of the present disclosure.

FIG. 10 shows an electronic boundary system 1000 including the linear virtual fence configured with surveillance camera, red light, lamp, speaker, GPS sensor, and other support devices in accordance with another implementation of the present disclosure. Results of the fence activity can be notified to the owner and administrator by connecting these devices. The GPS system provides location accuracy starting from the installation process to maintenance.

Figure 11:
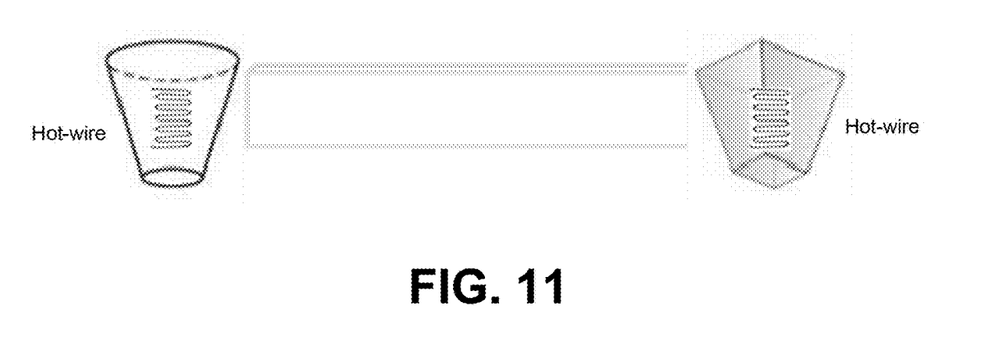
FIG. 11 shows example enclosures for base point units in accordance with one implementation of the present disclosure.

FIG. 11 shows example enclosures for base point units in accordance with one implementation of the present disclosure. In the illustrated implementation of FIG. 11, the enclosures configured as a pillar in the shape of a cylinder or rhombus on the outside. The enclosures can also be in the shape of a cone with an inclined plane including a hot wire to make rain or ice melt and trickle down as quickly as possible. These types of enclosures help prevent any disturbances to the fence system due to the build-up of water or ice.

Figure 12:
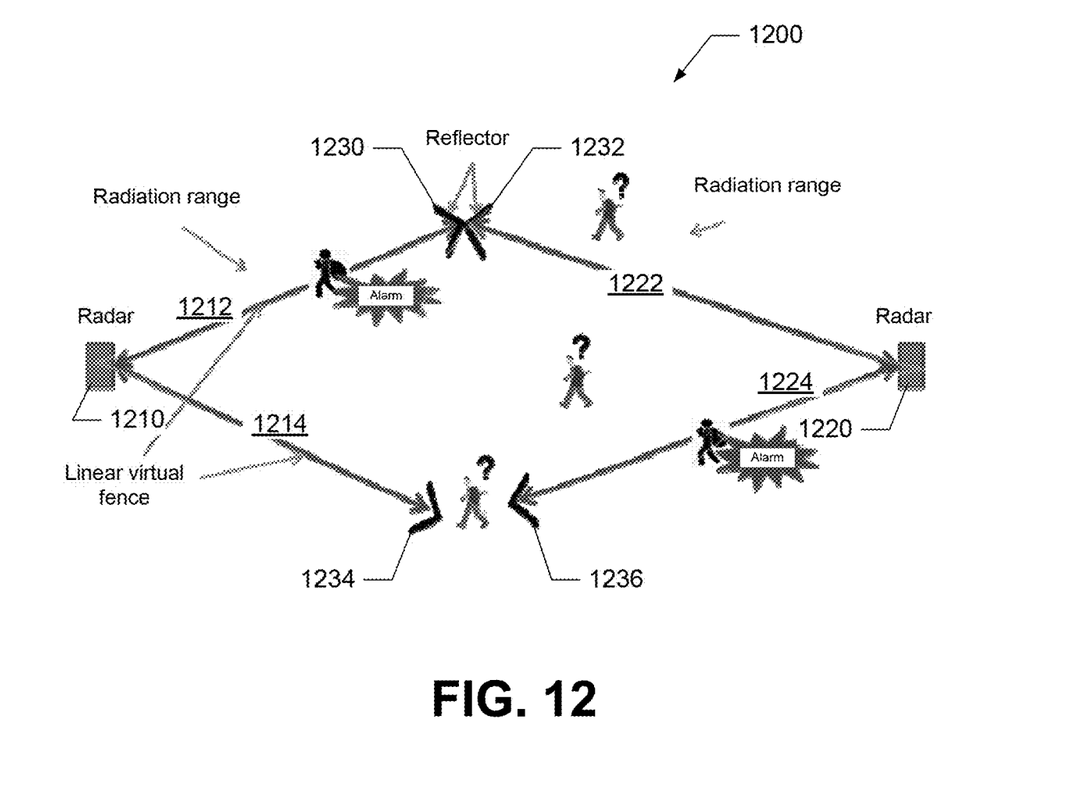
FIG. 12 is a diagram showing the process of detecting intrusions using more reflectors than radars in accordance with one implementation of the present disclosure.

FIG. 12 is a diagram 1200 showing the process of detecting intrusions using more reflectors than radars in accordance with one implementation of the present disclosure. In FIG. 12, using the spreading property of the electromagnetic waves from the radar 1210, 1220, multiple reflectors 1230, 1232, 1234, 1236 are configured within the range of the electromagnetic waves from each radar 1210, 1220. For example, two reflectors 1230, 1234 are placed at two different locations within the radiation range of the radar 1210, forming two linear virtual fences 1212, 1214. In another example, two reflectors 1232, 1236 are placed at two different locations within the radiation range of the radar 1220, forming two linear virtual fences 1222, 1224. In the illustrated implementation of FIG. 12, the two reflectors 1234, 1236 are placed with an interval, which creates a gate through which a permitted entry can be made.

In some implementations, the system includes: a radar including a transmitter and a receiver, the transmitter configured to transmit an electromagnetic wave; a reflector placed a predetermined distance away from the radar, the reflector configured to reflect the transmitted electromagnetic wave back to the receiver; and a control unit coupled to the radar and configured to measure a magnitude of the reflected electromagnetic wave received at the receiver from the reflector by measuring Doppler signal corresponding to the predetermined distance, wherein the control unit is configured to measure a reference value of the magnitude of the reflected electromagnetic wave when no intrusions are occurring, and wherein the control unit is configured to trigger an alarm when the magnitude of the reflected electromagnetic wave changes from the reference value.

In one implementation, the reflector is configured as a vertical reflector formed in a pillar shape. In another implementation, the reflector is configured in a triangular pyramid shape. In one implementation, the system further includes a base point unit configured to include the radar and the reflector. In another implementation, the system further includes a base point unit configured to include a plurality of radars and reflectors. In one implementation, the base point unit includes a positioning device configured to adjust azimuth and elevation of the reflector. In another implementation, the base point unit includes at least one of a surveillance camera, a GPS sensor, a red light, a lamp, a speaker, a hot-wires that prevent the accumulation of snow, or a cover that minimizes the reduction of electromagnetic waves. In one implementation, a size of the reflector is configured to be adjustable corresponding to a change in distance between the radar and the reflector. In one implementation, the system is used as a linear virtual fence system configured to create a closed virtual bounded area. In one implementation, the linear virtual fence system is configured into multiple shapes and sizes having multiple radars and reflectors.

One embodiment includes one or more programmable processors and corresponding computer system components which store and execute computer instructions, such as to provide intrusion detection using an electronic boundary system.

The above description of the disclosed embodiments is provided to enable any person skilled in the art to make or use the invention as described in the specification presented above. Various modifications to these embodiments will be readily apparent to those skilled in the art, and the generic principles described herein can be applied to other embodiments without departing from the spirit or scope of the disclosure. Accordingly, the techniques are not limited to the specific examples described above. Thus, it is to be understood that the description and drawings presented herein represent a presently possible embodiment of the disclosure and are therefore representative of the subject matter that is broadly contemplated by the present disclosure. It is further to be understood that the scope of the present disclosure fully encompasses other embodiments that may become obvious to those skilled in the art and that the scope of the present disclosure is accordingly limited by nothing other than the appended claims.

The invention claimed is:

1. A system comprising:
a radar including a transmitter and a receiver, the transmitter configured to transmit an electromagnetic wave;
a reflector placed a predetermined distance away from the radar, the reflector configured to reflect the transmitted electromagnetic wave back to the receiver; and
a control unit coupled to the radar and configured to
measure a magnitude of the reflected electromagnetic wave received at the receiver from the reflector by measuring received Doppler signals,
wherein the control unit is configured to measure a reference value of the magnitude of the reflected electromagnetic wave when no intrusions are occurring if a received Doppler signal is within a percentage tolerance that indicates that the received Doppler signal corresponds to the predetermined distance of the reflector, and
in response to the Doppler signal being within the percentage tolerance the control unit is configured to monitor for intrusion and trigger an alarm indicating intrusion when the magnitude of the reflected electromagnetic wave changes from the reference value.

2. The system of claim 1, wherein the reflector is configured as a vertical reflector formed in a pillar shape.

3. The system of claim 1, wherein the reflector is configured in a triangular pyramid shape.

4. The system of claim 1, further comprising
a base point unit configured to include a plurality of radars and reflectors.

5. The system of claim 4, wherein the base point unit includes a positioning device configured to adjust azimuth and elevation of the reflector.

6. The system of claim 4, wherein the base point unit includes at least one of a surveillance camera, a GPS sensor, a red light, a lamp, a speaker, a hot-wires that prevent the accumulation of snow, or a cover that minimizes the reduction of electromagnetic waves.

7. The system of claim 1, wherein a size of the reflector is configured to be adjustable corresponding to a change in distance between the radar and the reflector.

8. The system of claim 1, wherein the system is used as a linear virtual fence system configured to create a closed virtual bounded area.

9. The system of claim 8, wherein the linear virtual fence system is configured into multiple shapes and sizes having multiple radars and reflectors.

* * * * *